US012803236B2

(12) United States Patent
Pomari et al.

(10) Patent No.: US 12,803,236 B2
(45) Date of Patent: Nov. 17, 2026

(54) CONNECTORS FOR ELECTRICAL CONNECTION OF ELECTRICAL APPLIANCES TO ELECTRICAL NETWORKS

(71) Applicants: Kerz S.r.l., Concorezzo (IT); Parlux S.p.A., Trezzano sul Naviglio (IT)

(72) Inventors: Marco Pomari, Concorezzo (IT); Innocente Pomari, Concorezzo (IT)

(73) Assignees: KERZ S.R.L., Concorezzo (IT); PARLUX S.P.A., Trezzano Sul Naviglio (IT)

(*) Notice: Subject to any disclaimer, the term of this patent is extended or adjusted under 35 U.S.C. 154(b) by 358 days.

(21) Appl. No.: 18/708,852

(22) PCT Filed: Nov. 9, 2022

(86) PCT No.: PCT/IB2022/060785
§ 371 (c)(1),
(2) Date: May 9, 2024

(87) PCT Pub. No.: WO2023/084410
PCT Pub. Date: May 19, 2023

(65) Prior Publication Data

US 2025/0023309 A1 Jan. 16, 2025

(30) Foreign Application Priority Data

Nov. 10, 2021 (IT) ........................ 102021000028580

(51) Int. Cl.
*H01R 39/10* (2006.01)
*H01R 13/11* (2006.01)
*H01R 24/58* (2011.01)
*H01R 103/00* (2006.01)

(52) U.S. Cl.
CPC ........... *H01R 39/10* (2013.01); *H01R 13/112* (2013.01); *H01R 24/58* (2013.01); *H01R 2103/00* (2013.01)

(58) Field of Classification Search
CPC ...... H01R 39/10; H01R 13/112; H01R 24/58; H01R 2103/00
(Continued)

(56) References Cited

U.S. PATENT DOCUMENTS

| | | | | |
|---|---|---|---|---|
| 2,751,565 A * | 6/1956 | Johnston | ................ | H02G 11/02 439/22 |
| 4,583,797 A * | 4/1986 | Engelmore | ............ | H01R 39/64 439/22 |

(Continued)

FOREIGN PATENT DOCUMENTS

| | | |
|---|---|---|
| DE | 199002034 U1 | 4/1990 |
| DE | 19902034 A1 | 7/2000 |

(Continued)

OTHER PUBLICATIONS

International Search Report and Written Opinion (replaced) dated May 19, 2023, in corresponding International Application No. PCT/IB2022/060785, 11 pages.

(Continued)

*Primary Examiner* — Gary F Paumen

(74) *Attorney, Agent, or Firm* — MH2 Technology Law Group LLP

(57) ABSTRACT

A connector for electrical connection of an appliance to a power cable may include: a rotating body associated with the cable; and an annular element configured to surround the body. When the annular element is coupled to the body, that coupling may determine the electrical connection between the annular element and body through electrical contacts, and the annular element and body may rotate relative to each other. The body may include first and second electrical contacts, which appear as discs of electrically conductive material. The discs may be superimposed and may be interspersed with a spacer of insulating material, also disc-shaped. The discs and disc-shaped spacer may be of equal (Continued)

radius. The annular element may include two jaws configured to close on the body, and third and fourth electrical contacts inside at least one of the two jaws configured to grip a respective disc using sliding electrical contact.

20 Claims, 3 Drawing Sheets

(58) Field of Classification Search
USPC ............................................ 439/137, 22, 27
See application file for complete search history.

(56) References Cited

U.S. PATENT DOCUMENTS

| | | | | |
|---|---|---|---|---|
| 5,409,403 A | | 4/1995 | Falossi et al. | |
| 6,068,490 A | * | 5/2000 | Salzberg | H01R 39/64 439/23 |
| 2018/0076591 A1 | | 3/2018 | Hogan | |
| 2020/0313377 A1 | * | 10/2020 | Autenzeller | H01R 39/34 |

FOREIGN PATENT DOCUMENTS

| | | | | | |
|---|---|---|---|---|---|
| EP | 0945935 A1 | * | 9/1999 | H01R 39/26 |
| EP | 2258028 B1 | | 12/2010 | |
| JP | H07307190 A | | 11/1995 | |
| KR | 1020100069838 A | | 6/2010 | |

OTHER PUBLICATIONS

International Preliminary Report on Patentability dated Feb. 16, 2024, in corresponding International Application No. PCT/IB2022/060785, 13 pages.

* cited by examiner

CONNECTORS FOR ELECTRICAL CONNECTION OF ELECTRICAL APPLIANCES TO ELECTRICAL NETWORKS

CROSS-REFERENCE TO RELATED APPLICATION(S)

This application is a national stage entry from International Application No. PCT/IB2022/060785, filed on Nov. 9, 2022, in the Receiving Office ("RO/IB") of the of the International Bureau of the World Intellectual Property Organization ("WIPO"), and published as International Publication No. WO 2023/084410 A1 on May 19, 2023. International Application No. PCT/IB2022/060785 claims priority under 35 U.S.C. §119 from Italian Patent Application No. 102021000028580, filed on Nov. 10, 2021, in the Italian Patent and Trademark Office ("IPTO"). The entire contents of the above-listed applications are incorporated herein by reference.

The present invention relates to a connector for the electrical connection of an electrical appliance to the electrical network.

Examples of such electrical or electronic equipment to be connected are generally electric tools, such as a hair dryer, vacuum cleaner, iron, pressure washer, but the main use illustrated in the preferred embodiment is for a hair dryer.

A type of connector for domestic equipment is illustrated in patent U.S. Pat. No. 5,409,403, which describes a connector consisting of a male and a female part capable of rotating relative to each other by 360°. The female connector has a plurality of concentric metal rings and the male connector has similar concentric metal rings which contact when the male is inserted into the female, resulting in the electrical connection. The rings on the female connector and those on the male have a concave profile, so that when the male is inserted into the female, the two parts bind together in the axial direction, while they remain free to rotate relative to each other.

Patent DE19902034 describes a connector comprising a coaxial plug and a corresponding coaxial socket. The coaxial electrical contacts of both the male and female parts are rings which abut each other, creating the electrical contact between the two parts.

Patent EP2258028 describes a device for the electrical connection of domestic appliances or electric tools, comprising a female receptacle provided with two seats and a male connector which can be inserted inside said female receptacle. The male connector is provided with a first means of electrical contact formed by a pin or tip and a second means of electrical contact formed by a ring. Said male connector is provided with a plastic body to which the electrical contacts are fixed.

The tip and ring are concentric to each other, and are removably inserted inside said female receptacle housings so as to allow a continuous rotation of the male connector relative to the female receptacle around the longitudinal axis.

The housings consist of two retention springs of a metallic nature and are essentially cylindrical in shape with a radius which allows the pin or tip and ring to be inserted and disengaged therefrom and have adequate elastic properties.

The applicant has observed that in the connectors described above, the female contacts are generally cylindrical in shape and accommodate the male so that the physical and electrical contact between the male and the female is 360°.

Although ensuring a good reliability of the electrical connection, this results in significant friction between the male and female when rotating relative to each other. Furthermore, the electrical contact surface between male and female is a significant area which generates an equally significant amount of heat, which can be difficult to control in an electrical appliance.

Such connectors are, for example, used to connect the power cable of a hair dryer, which when used especially professionally by a hairdresser, is rotated very frequently; in essence, having the cable free to rotate around its axis with respect to the hair dryer when the latter is being handled prevents the cable from twisting, and knots from forming along the same.

Therefore, if the aim is to make a rotating connector, i.e., to allow free rotation at will between the male and the female and at the same time ensure a reliable electrical connection between the two parts, connectors with cylindrical contacts are not an optimal choice. Since the friction is distributed over the entire cylindrical surface of the annular contacts, it becomes relevant for the long-term reliability of the electrical connection.

The present invention is intended to overcome the aforementioned drawbacks by proposing a connector for the electrical connection of an electrical appliance to the electrical network having the characteristics of the attached claim 1.

The characteristics and advantages of the present invention will be clearer and evident from the following illustrative and non-limiting description, of an embodiment of the connector, with reference to the attached figures which illustrate respectively:

Figure 2:
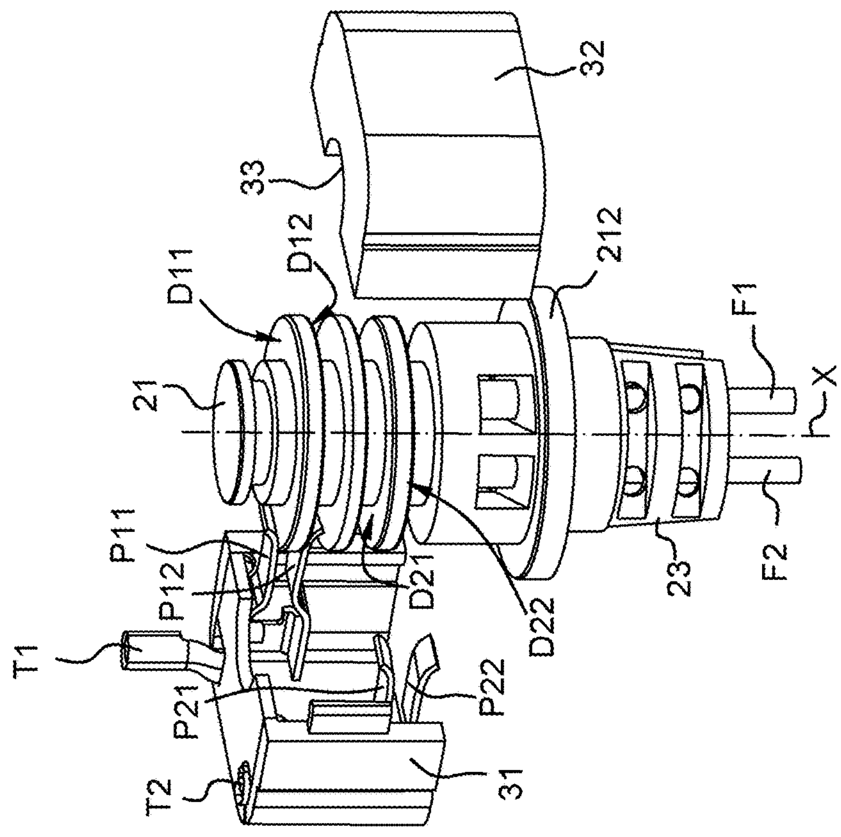
FIG. 2 depicts the connector in perspective view with the rotating body assembled and the annular element disassembled according to the present invention.
Figure 1:
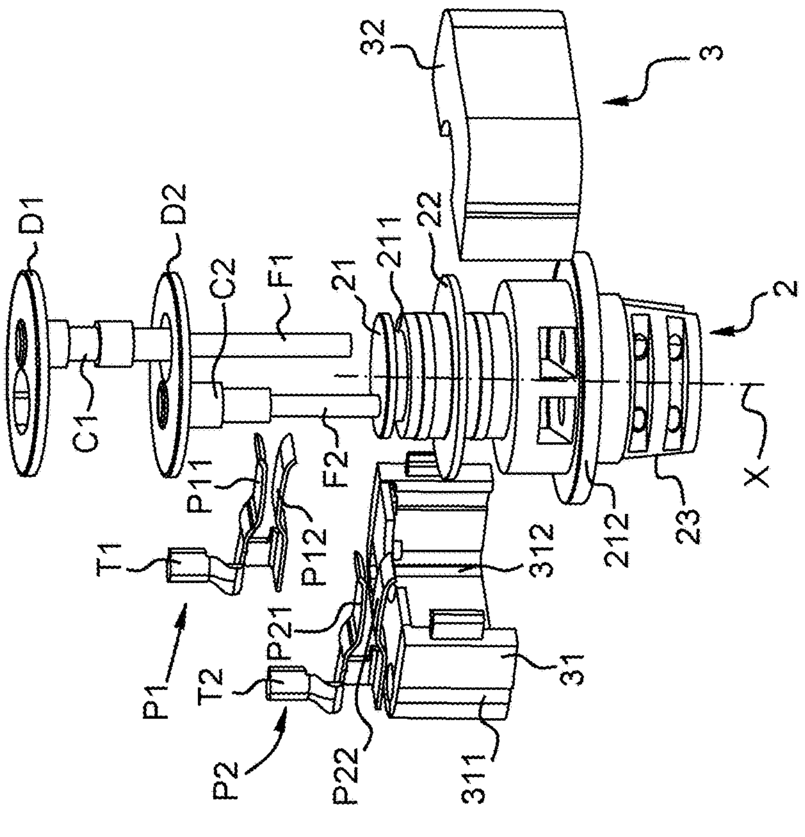
FIG. 1 depicts the connector in perspective and exploded view according to the present invention.
Figure 4:
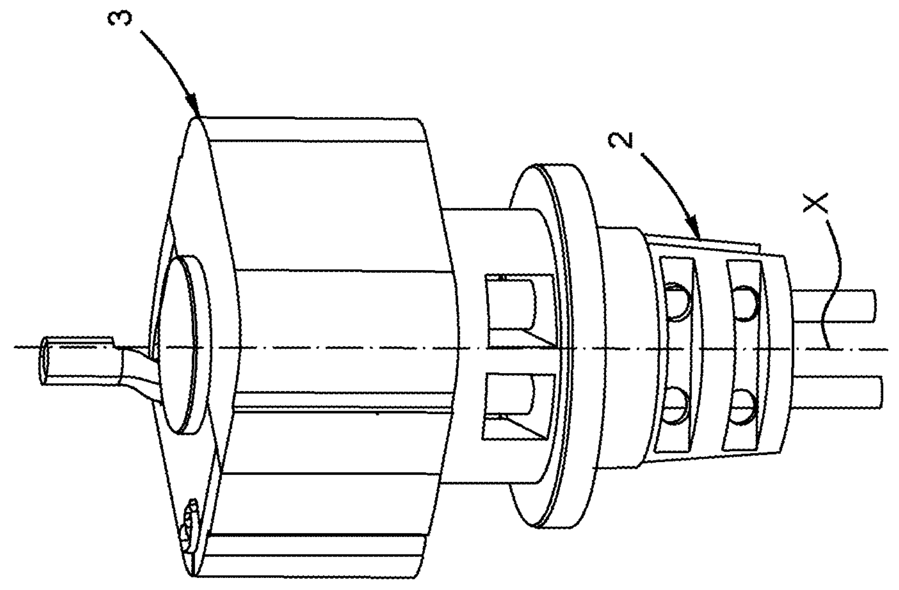
FIG. 4 depicts the connector in perspective view fully assembled according to the present invention.
Figure 3:
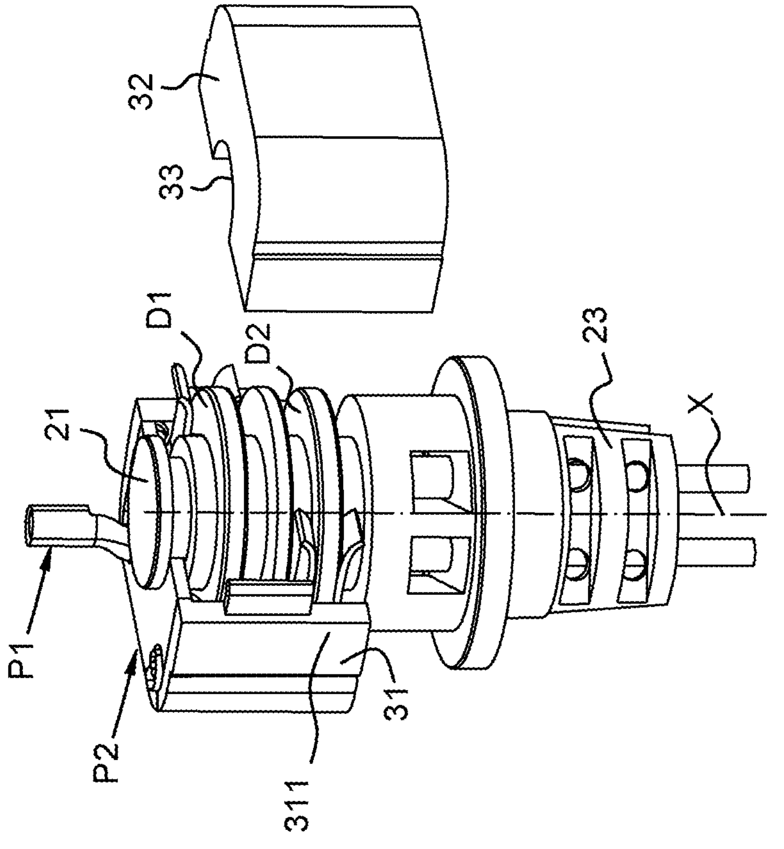
FIG. 3 depicts the connector in perspective view with the rotating body assembled and the annular element partially coupled to the rotating body according to the present invention.

The connector according to the present invention can be used in all electrical equipment with a handle or grip which is frequently moved by the operator during use, who consequently also moves and/or rotates the power supply cable.

Advantageously, the connector of the present invention can be used in equipment where the power supply cable enters them from the handle/grip, or close thereto. Examples of such types of equipment are a hair dryer, a hair straightener, an iron, a pressure washer, etc.

With reference to the above-mentioned figures, the rotating electrical connector comprises a rotating body 2, which is associated with such a power supply cable, and an annular element 3, which surrounds such a rotating body and which, when coupled thereto, determines the electrical connection therebetween through respective electrical contacts. The rotating body 2 and the annular element 3, when assembled together, are capable of rotating relative to each other around a longitudinal axis X of the rotating body.

The rotating body 2 is made of an electrically insulating material (i.e., a plastic material), is elongated in shape and comprises a first D1 and a second D2 electrical contact, both of which appear as discs (a first disc D1 and a second disc D2) of electrically conducting material (i.e., metal), preferably concentric and overlapping. Such contacts are made near the head 21 of the rotating body, which is essentially cylindrical in shape. Preferably, such discs are superimposed one on top of the other and may be interspersed with a spacer 22 of insulating material, also disc-shaped. Moreover, such discs are advantageously of equal radius.

The discs D1 and D2 comprise respective electrical connection cylinders C1 and C2 inside which the electrical wires F1 and F2 (phase and neutral) of such a conventional power supply cable are inserted, which are positioned vertically in contact with the lower surface of the respective disc and extend downwards inside suitable communication channels obtained inside the rotating body 2, in which the aforementioned phase and neutral wires of the cable also pass, so as to exit from a lower tail 23 of the rotating body itself. Such a tail 23 is essentially truncoconical, and the arrangement of the channels therein also allows centring the connector of the discs D1 and D2 in the rotating body during assembly.

The electrical wires are fixed inside such cylinders C1 and C2 by 'crimping', which is done by mechanically crushing the tubular, so that the cable remains clamped on the connector due to the pressure (crushing) exerted. This ensures a good electrical contact, which is superior to what welding would ensure. The crimping operation is irreversible, meaning that once the connector is applied to the end part of the cable, it is impossible to remove it without damaging the cable and connector. A conventional grommet (not shown) is then moulded on such a portion of the tail.

The head 21 of the rotating body 2 comprises at its upper end an annular groove 211 and at its lower end, in the junction area with the tail 23, it comprises an annular projection 212. Such a groove determines the correct positioning of the annular element 3 when coupled around such a rotating body.

The annular element 3 is also made of an electrically insulating material (i.e., a plastic material) and comprises a pair of jaws 31 and 32, preferably of a substantially rectangular radial shape, which close on the rotating body 2.

Inside at least one of the two jaws, a third P1 and a fourth P2 electrical contact are made which, when the jaws are coupled to the rotating body, go to abut the corresponding first and second electrical contact D1 and D2 of the rotating body itself. Specifically, the electrical contacts P1 and P2 of the jaws appear as pliers grasping the respective disc, making a sliding contact, whereby an upper arm of the pliers P11 or P21 rests on the upper surface of the disc D11 or D21 and the lower arm P12 or P22 abuts the lower surface of the same disc D12 or D22. The arms of the pliers have inverse convexity relative to each other so that their ends are normally open to facilitate the insertion of the edge of the respective disc.

In the fulcrum area, the pliers are shaped so as to facilitate their interlocking fixing in the jaw body and, furthermore, have electrical connection terminals T1 and T2 emerging from conduits 311 and 312 obtained vertically in the jaw. The arrangement of the ducts in the jaw also determines the correct positioning of the pliers P1 and P2 in relation to the discs D1 and D2 when assembling the connector.

The jaws preferably comprise a groove 33 in their upper surface, which when assembled on the rotating body corresponds with the upper annular groove 211, determining the correct positioning and assembly of the connector and optimal electrical contact between the pliers and the discs.

The groove 211 prevents the inadvertent vertical disassembly of the connector, simultaneously ensuring the comfortable rotation of the rotating body between the jaws.

Once the rotating body 2 has been assembled with the annular element 3, the connector can be inserted in a special seat of the handle M of the electrical equipment, or more generally in the body of the electrical equipment. The annular element is locked in the handle while the rotating body can rotate freely around such a junction axis X, together with the power supply cable of the equipment, without causing kinking.

The connector as described above allows to obtain a stable electrical contact (even over time) and at the same time ensures sufficient freedom of rotation between the two parts. In fact, the pliers ensure a stable electrical contact with the discs, resulting in low friction between the parts sliding with each other and thus limited wear over time. Lastly, the constraint of the wires by 'crimping' also improves the quality of the electrical contact.

Figure 6:
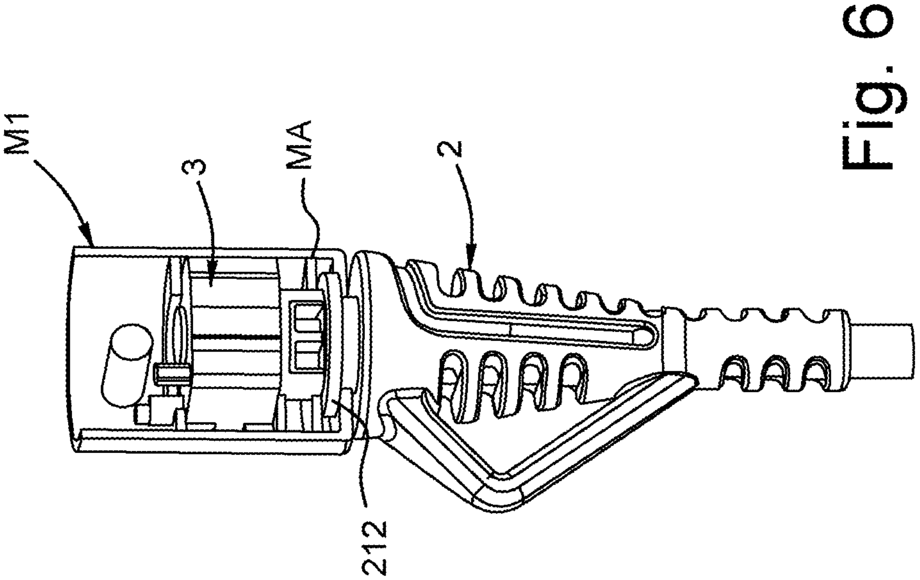
FIG. 6 depicts the connector inserted in the end part of a handle formed by two shells, of which one of the two shells has been omitted.
Figure 5:
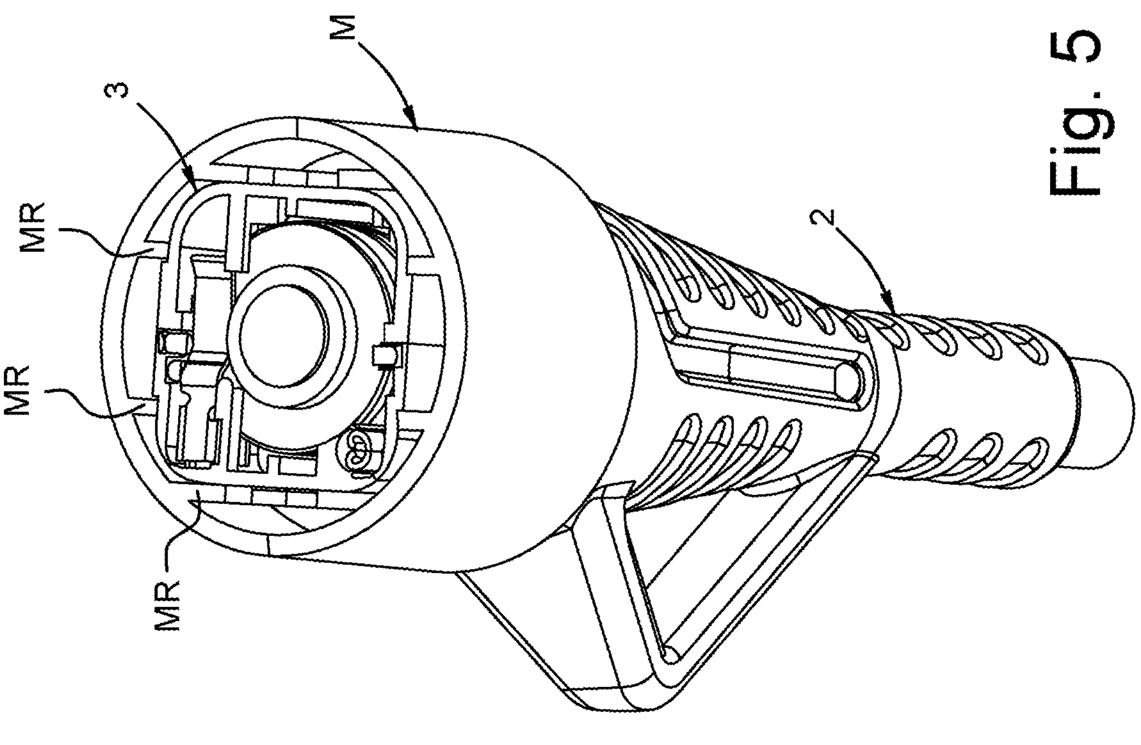
FIG. 5 depicts the connector inserted in a portion of the handle.

The connector can be assembled inside the equipment handle as illustrated in FIGS. 5 and 6, or elsewhere on the equipment.

The handle M, or the insertion point in the equipment, is formed by two shells, for example semi-cylindrical (of which only one M1 is shown in FIG. 6) which have ribs MR through which the annular element 3 is locked therein. Such ribs also determine the formation of air passages between such an element and the inner surface of the shell, which promote heat exchange with the outside of the handle so as to maintain the electrical connector at an optimal temperature. The rotating body 2 is imprisoned in the handle through its annular projection 212, which inserts into a special annular seat NA obtained on both shells of the handle. Such a seat favours and does not constitute an impediment to the rotation between handle M and rotating body 2.

The ease of rotation between the rotating body 2 and the annular element 3 made integral with the handle M or the insertion point in the equipment prevents the kinking of the power supply cable, safeguarding the maintenance of the electrical connection and the stability of the operating temperature inside the annular element 3.

The invention claimed is:

1. A connector for electrical connection of an electrical appliance to a power supply cable of an electrical network, the connector comprising:

- a rotating body associated with the power supply cable; and
- an annular element configured to surround the rotating body;
- wherein when the annular element is coupled to the rotating body, that coupling determines the electrical connection between the annular element and the rotating body through respective electrical contacts,
- wherein when the annular element is coupled to the rotating body, the annular element and the rotating body are configured to rotate relative to each other around a longitudinal axis of the rotating body,
- wherein the rotating body is elongated and includes first and second electrical contacts, which both appear as discs of electrically conductive material, concentric and superimposed,
- wherein the discs are superimposed one on top of the other and are interspersed with a spacer of insulating material, also disc-shaped, wherein the discs and the disc-shaped spacer are of equal radius, wherein the annular element includes two jaws configured to close on the rotating body, and third and fourth electrical contacts are made inside at least one of the two jaws, and wherein the third and fourth electrical contacts appear as pliers configured to grip a respective disc using sliding electrical contact.

2. The connector of claim 1, wherein the first and second electrical contacts are made in proximity to a head of the rotating body having a substantially cylindrical shape.

3. The connector of claim 1, wherein the rotating body comprises electrically insulating material.

4. The connector of claim 1, wherein the annular element comprises electrically insulating material.

5. The connector of claim 1, wherein the discs comprise respective electrical connection cylinders inside of which electrical wires of the power supply cable are inserted, and wherein the electrical wires are positioned vertically in contact with a lower surface of a respective disc and extend downward, inside suitable communication channels inside the rotating body, so as to come out from a lower tail of the rotating body. itself.

6. The connector of claim 1, wherein an upper arm of the third electrical contact rests on an upper surface of the first electrical contact, wherein a lower arm of the third electrical contact meets a lower surface of the first electrical contact, and wherein the upper and lower arms of the third electrical contact present inverse convexity with respect to each other, so as to present a normally open end to facilitate insertion of an edge of the first electrical contact.

7. The connector of claim 1, wherein in a region of a fulcrum of the third and fourth electrical contacts, the third and fourth electrical contacts have a shape so as to facilitate their interlocking fixing in a body of the at least one of the two jaws.

8. The connector of claim 1, wherein the third electrical contact comprises an electrical connection terminal that emerges from a duct formed vertically in a respective jaw.

9. The connector of claim 1, wherein upper surfaces of the jaws comprise a recess which, when assembled on the rotating body, corresponds with an upper annular groove of the rotating body, determining a correct assembly of the connector and optimal electrical contact between the first and third electrical contacts.

10. Electrical equipment equipped with a handle or grip comprising the connector of claim 1.

11. The electrical equipment of claim 10, in which a handle is formed by two shells that have ribs through which the annular element is locked in the handle.

12. The electrical equipment of claim 11, in which the rotating body is trapped in the handle using an annular projection of the rotating body which is inserted in an annular seat in the two shells of the handle.

13. The connector of claim 1, wherein an upper arm of the third electrical contact rests on an upper surface of the first electrical contact, wherein a lower arm of the third electrical contact meets a lower surface of the first electrical contact, wherein the upper and lower arms of the third electrical contact present inverse convexity with respect to each other, so as to present a first normally open end to facilitate insertion of an edge of the first electrical contact, wherein an upper arm of the fourth electrical contact rests on an upper surface of the second electrical contact, wherein a lower arm of the fourth electrical contact meets a lower surface of the second electrical contact, and wherein the upper and lower arms of the fourth electrical contact present inverse convexity with respect to each other, so as to present a second normally open end to facilitate insertion of an edge of the second electrical contact.

14. The connector of claim 1, wherein the third electrical contact comprises a first electrical connection terminal that emerges from a first duct formed vertically in a first of the two jaws, and wherein the fourth electrical contact comprises a second electrical connection terminal that emerges from a second duct formed vertically in a second of the two jaws.

15. The connector of claim 1, wherein upper surfaces of the jaws comprise a recess which, when assembled on the rotating body, corresponds with an upper annular groove of the rotating body, determining a correct assembly of the connector, optimal electrical contact between the first and third electrical contacts, and optimal electrical contact between the second and fourth electrical contacts.

16. A connector for electrical connection of an electrical appliance to a power supply cable of an electrical network, the connector comprising:

a rotating body associated with the power supply cable; and an annular element configured to surround the rotating body;

wherein when the annular element is coupled to the rotating body, that coupling determines the electrical connection between the annular element and the rotating body through first, second, third, and fourth electrical contacts, wherein when the annular element is coupled to the rotating body, the annular element and the rotating body are configured to rotate relative to each other around a longitudinal axis of the rotating body, wherein the rotating body comprises the first and second electrical contacts, which comprise concentric discs of electrically conductive material, wherein the discs are superimposed one on top of the other and are separated by a disc-shaped spacer of insulating material, wherein the discs and the disc-shaped spacer are of equal radius, wherein the annular element comprises the third and fourth electrical contacts, wherein the third electrical contacts are configured to grip the first electrical contact using sliding electrical contact, and wherein the fourth electrical contacts are configured to grip the second electrical contact using sliding electrical contact.

17. The connector of claim 16, wherein the rotating body comprises electrically insulating material.

18. The connector of claim 16, wherein the annular element comprises electrically insulating material.

19. Electrical equipment comprising the connector of claim 16.

20. Electronic equipment comprising the connector of claim 16.

* * * * *